(12) United States Patent
Affinito et al.

(10) Patent No.: US 6,497,924 B2
(45) Date of Patent: *Dec. 24, 2002

(54) METHOD OF MAKING NON-LINEAR OPTICAL POLYMER

(75) Inventors: John D. Affinito, Tucson, AZ (US); Gordon L. Graff, West Richland, WA (US); Peter M. Martin, Kennewick, WA (US); Mark E. Gross, Pasco, WA (US); Paul E. Burrows, Kennewick, WA (US); Linda S. Sapochak, Henderson, NV (US)

(73) Assignee: Battelle Memorial Institute, Richland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/811,872

(22) Filed: Mar. 19, 2001

(65) Prior Publication Data

US 2002/0090460 A1 Jul. 11, 2002

Related U.S. Application Data

(63) Continuation-in-part of application No. 09/212,977, filed on Dec. 16, 1998, now Pat. No. 6,274,204.

(51) Int. Cl.[7] .............................. B05D 3/06; B05D 3/10
(52) U.S. Cl. ............... 427/497; 427/509; 427/551; 427/553; 427/562; 427/595; 427/255.14; 427/255.6; 427/255.7; 427/294; 427/398.1; 427/421
(58) Field of Search ................................ 427/497, 509, 427/551, 553, 562, 595, 255.14, 255.6, 255.7, 294, 398.1, 421

(56) References Cited

U.S. PATENT DOCUMENTS

| | | | |
|---|---|---|---|
| 3,475,307 A | 10/1969 | Knox et al. |
| 3,607,365 A | 9/1971 | Lindlof |
| 4,098,965 A | 7/1978 | Kinsman |
| 4,283,482 A | 8/1981 | Hattori et al. |
| 4,581,337 A | 4/1986 | Frey et al. |

(List continued on next page.)

FOREIGN PATENT DOCUMENTS

| | | |
|---|---|---|
| BE | 704 297 | 2/1968 |
| DE | 19603746 | 4/1997 |
| EP | 0 299 753 | 1/1989 |
| EP | 0 340 935 | 11/1989 |
| EP | 0 390 540 | 10/1990 |

(List continued on next page.)

OTHER PUBLICATIONS

Affinito, J.D., Energy Res. Abstr. 18(6), #17171, 1993.*
Affinito, J.D. et al., "Molecularly Doped Polymer Composite Films for Light Emitting Polymer Applications Fabricated by the PML Process" 1998 Society of Vaccum Coaters, 41st Annual Technical Conference Proceedings (1998), pp. 220–225.

(List continued on next page.)

*Primary Examiner*—Erma Cameron
(74) *Attorney, Agent, or Firm*—Killworth, Gottman, Hagan & Schaeff, L.L.P.

(57) ABSTRACT

A method for making a non-linear optical polymer layer. The method includes flash evaporating a liquid polymer precursor mixture containing a plurality of non-linear optical molecules forming an evaporate, cryocondensing the evaporate on a substrate forming a cyrocondensed polymer precursor layer, and crosslinking the cryocondensed polymer precursor layer. The surface may be electrically biased for poling during crosslinking.

18 Claims, 3 Drawing Sheets

U.S. PATENT DOCUMENTS

| | | |
|---|---|---|
| 4,624,867 A | 11/1986 | Iijima et al. |
| 4,695,618 A | 9/1987 | Mowrer |
| 4,842,893 A | 6/1989 | Yializis et al. |
| 4,954,371 A | 9/1990 | Yializis |
| 5,032,461 A | 7/1991 | Shaw et al. |
| 5,204,314 A | 4/1993 | Kirlin et al. |
| 5,237,439 A | 8/1993 | Misono et al. |
| 5,260,095 A | 11/1993 | Affinito |
| 5,354,497 A | 10/1994 | Fukuchi et al. |
| 5,395,644 A | 3/1995 | Affinito |
| 5,427,638 A | 6/1995 | Goetz et al. |
| 5,440,446 A | 8/1995 | Shaw et al. |
| 5,536,323 A | 7/1996 | Kirlin et al. |
| 5,547,508 A | 8/1996 | Affinito |
| 5,554,220 A | 9/1996 | Forrest et al. |
| 5,576,101 A | 11/1996 | Saitoh et al. |
| 5,607,789 A | 3/1997 | Treger et al. |
| 5,620,524 A | 4/1997 | Fan et al. |
| 5,629,389 A | 5/1997 | Roitman et al. |
| 5,652,192 A | 7/1997 | Matson et al. |
| 5,654,084 A | 8/1997 | Egert |
| 5,665,280 A | 9/1997 | Tropsha |
| 5,681,615 A | 10/1997 | Affinito et al. |
| 5,681,666 A | 10/1997 | Treger et al. |
| 5,684,084 A | 11/1997 | Lewin et al. |
| 5,686,360 A | 11/1997 | Harvey, III et al. |
| 5,693,956 A | 12/1997 | Shi et al. |
| 5,711,816 A | 1/1998 | Kirlin et al. |
| 5,725,909 A | 3/1998 | Shaw et al. |
| 5,731,661 A | 3/1998 | So et al. |
| 5,747,182 A | 5/1998 | Friend et al. |
| 5,757,126 A | 5/1998 | Harvey, III et al. |
| 5,759,329 A | 6/1998 | Krause et al. |
| 5,792,550 A | 8/1998 | Phillips et al. |
| 5,811,177 A | 9/1998 | Shi et al. |
| 5,811,183 A | 9/1998 | Shaw et al. |
| 5,821,692 A | 10/1998 | Rogers et al. |
| 5,844,363 A | 12/1998 | Gu et al. |
| 5,872,355 A | 2/1999 | Hueschen |
| 5,902,641 A | 5/1999 | Affinito et al. |
| 5,902,688 A | 5/1999 | Antoniadis et al. |
| 5,904,958 A | 5/1999 | Dick et al. |
| 5,912,069 A | 6/1999 | Yializis et al. |
| 5,919,328 A | 7/1999 | Tropsha et al. |
| 5,922,161 A | 7/1999 | Wu et al. |
| 5,945,174 A | 8/1999 | Shaw et al. |
| 5,948,552 A | 9/1999 | Antoniadis et al. |
| 5,955,161 A | 9/1999 | Tropsha |
| 5,965,907 A | 10/1999 | Huang et al. |
| 5,968,620 A | 10/1999 | Harvey et al. |
| 5,996,498 A | 12/1999 | Lewis |
| 6,013,337 A | 1/2000 | Knors |
| 6,045,864 A | 4/2000 | Lyons et al. |
| 6,083,628 A | 7/2000 | Yializis |
| 6,092,069 A | 7/2000 | Yializis et al. |
| 6,106,627 A | 8/2000 | Yializis |
| 6,146,225 A | 11/2000 | Sheats et al. |
| 6,165,566 A | 12/2000 | Tropsha |
| 6,214,422 B1 | 4/2001 | Yializis |
| 6,231,939 B1 | 5/2001 | Shaw et al. |

FOREIGN PATENT DOCUMENTS

| | | |
|---|---|---|
| EP | 0 547 550 | 6/1993 |
| EP | 0 590 467 | 4/1994 |
| EP | 0 722 787 | 7/1996 |
| EP | 0 787 826 | 8/1997 |
| EP | 0 916 394 | 5/1999 |
| EP | 0 931 850 | 7/1999 |
| EP | 0 977 469 | 2/2000 |
| JP | 63136316 | 6/1988 |
| JP | 64-18441 | 1/1989 |
| JP | 2-183230 | 7/1990 |
| JP | 08325713 | 12/1996 |
| JP | 09059763 | 3/1997 |
| WO | WO 87 07848 | 12/1987 |
| WO | WO 95 10117 | 4/1995 |
| WO | WO 97 04885 | 2/1997 |
| WO | WO 97 22631 | 6/1997 |
| WO | WO 98 10116 | 3/1998 |
| WO | WO 98 18852 | 5/1998 |
| WO | WO 99 16557 | 4/1999 |
| WO | WO 99 16931 | 4/1999 |
| WO | WO 00/35603 | * 6/2000 |
| WO | WO 00/35604 | * 6/2000 |

OTHER PUBLICATIONS

Shi, M.K., et al., Plasma treatment of PET and acrylic coating surfaces–I. In situ XPS measurements, Journal of Adhesion Science and Technology, Mar. 2000, 14(12), pp. 1–28.

Shi, M.K., et al., In situ and real–time monitoring of plasma–induced etching PET and acrylic films, Plasmas and Polymers, Dec. 1999, 4(4), pp. 1–25.

Affinito, J.D., et al., Vacuum Deposited Conductive Polymer Films, The Eleventh International Conference on Vacuum Web Coating, no earlier than Feb. 1998, pp. 200–213.

Mahon, J.K., et al., Requirements of Flexible Substrates for Organic Light Emitting Devices in Flat Panel Display Applications, Society of Vacuum Coaters, 42nd Annual Technical Conference Proceedings, 1999, pp. 456–459.

Affinito, J.D., et al., "Vacuum Deposition of Polymer Electrolytes on Flexible Substrates," "Proceedings of the Ninth International Conference on Vacuum Web Coating," Nov. 1995 ed R. Bakish, Bakish Press 1995, p. 20–36.

Vossen, J.L., et al., Thin Film Processes, Academic Press, 1978, Part II, Chapter 11–1, Glow Discharge Sputter Deposition, p. 12–63; Part IV, Chapter IV–1, Plasma Deposition of Inorganic Compounds and Chapter IV–2 Glow Discharge Polymerization, p. 355–397.

Penning, F.M., Electrical Discharges in Gasses, Gordon and Breach Science Publishers, 1965, Chapters 5–6, p. 19–35, and Chapter 8, p. 41–50.

Affinito, J.D., et al, "High Rate Vacuum Deposition of Polymer Electrolytes," Journal Vacuum Science Technology A 14(3), May/Jun. 1996.

Inoue et al., Fabrication of a Thin Film of MNA by Vapour Deposition, Proc. Jpn. Congr. Mater. Res., vol. 33, p. 177–9, 1990.

Affinito, J.D. et al., "PML/Oxide/PML Barrier Layer Performance Differences Arising From Use of UV or Electron Beam Polymerization of the PML Layers," Thin Solid Films, Elsevier Science S.A., vol. 308–309, Oct. 31, 1997, pp. 19–25.

Gustafsson, G. et al, "Flexible light–emitting diodes made from soluble conducting polymers," Nature, vol. 357, Jun. 11, 1992, pp. 447–479.

Affinito, J.D. et al., "Polymer–Oxide Transparent Barrier Layers," SVC 39th Annual Technical Conference, Vacuum Web Coating Session, 1996, pp. 392–397.

Affinito, J.D. et al, "PML/Oxide/PML Barrier Layer Performance Differences Arising From Use of UV or Electron Beam Polymerization of the PML Layers," SVC 40th Annual Technical Conference, 1997, pp. 19–25.

Wong, C.P., "Recent Advances in IC Passivation and Encapsulation: Process Techniques and Materials," Polymers for Electronic and Photonic Applications, AT&T Bell Laboratories, 1993, pp. 167–209.

De Gryse, R. et al., Sputtered Transparent Barrier Layers, pp. 190–198, Proc. Int. Conf. Vac. Web Coat, 10th, 1996.

Tropsha et al., "Activated Rate Theory Treatment of Oxygen and Water Transport through Silicon Oxide/Poly(ethylene terephthalate) Composite Barrier Structures," J. Phys. Chem B 1997, pp. 2259–2266.

Tropsha et al., "Combinatorial Barrier Effect of the Multilayer $SiO_x$ Coatings on Polymer Substrates," 1997 Society of Vacuum Coaters, 40th Annual Technical Conference Proceedings.

Phillips et al., "Evaporated Dielectric Colorless Films on PET and OPP Exhibiting High Barriers Toward Moisture and Oxygen," Society of Vacuum Coaters, 36th Annual Technical Conference Proceedings (1993), pp. 293–300.

Chahroudi, Transparent Glass Barrier Coatings for Flexible Film Packaging, Society of Vacuum Coaters, 34th Annual Technical Conference Proceedings (1991), pp. 130–133.

Yamada et al., "The Properties of a New Transparent and Colorless Barrier Film," Society of Vacuum Coaters, 38th Annual Technical Conference Proceedings (1995), pp. 28–31.

* cited by examiner

METHOD OF MAKING NON-LINEAR OPTICAL POLYMER

This is a continuation in part of application Ser. No. 09/212,977, entitled "Method of Making Non-Linear Optical Polymer," filed Dec. 16, 1998, now U.S. Pat. No. 6,274,204.

BACKGROUND OF THE INVENTION

The present invention relates generally to a method of making non-linear optical polymer films. Additional layers of polymer or metal may be added under vacuum as well.

As used herein, the term "(meth)acrylic" is defined as "acrylic or methacrylic." Also, "(meth)acylate" is defined as "acrylate or methacrylate."

As used herein, the term "cryocondense" and forms thereof refer to the physical phenomenon of a phase change from a gas phase to a liquid phase upon the gas contacting a surface having a temperature lower than a dew point of the gas.

As used herein, the term "conjugated" refers to a chemical structure of alternating single and double bonds between carbon atoms in a carbon atom chain.

As used herein, the term "polymer precursor" includes monomers, oligomers, and resins, and combinations thereof. As used herein, the term "monomer" is defined as a molecule of simple structure and low molecular weight that is capable of combining with a number of like or unlike molecules to form a polymer. Examples include, but are not limited to, simple acrylate molecules, for example, hexanedioldiacrylate, and tetraethyleneglycoldiacrylate, styrene, methyl styrene, and combinations thereof. The molecular weight of monomers is generally less than 1000, while for fluorinated monomers, it is generally less than 2000. Substructures such as $CH_3$, t-butyl, and CN can also be included. Monomers may be combined to form oligomers and resins, but do not combine to form other monomers.

As used herein, the term "oligomer" is defined as a compound molecule of at least two monomers that may be cured by radiation, such as ultraviolet, electron beam, or x-ray, glow discharge ionization, and spontaneous thermally induced curing. Oligomers include low molecular weight resins. Low molecular weight is defined herein as about 1000 to about 20,000 exclusive of fluorinated monomers. Oligomers are usually liquid or easily liquifiable. Oligomers do not combine to form monomers.

As used herein, the term "resin" is defined as a compound having a higher molecular weight (generally greater than 20,000) which is generally solid with no definite melting point. Examples include, but are not limited to, polystyrene resin, epoxy polyamine resin, phenolic resin, and acrylic resin (for example, polymethylmethacrylate), and combinations thereof.

The basic process of plasma enhanced chemical vapor deposition (PECVD) is described in THIN FILM PROCESSES, J. L. Vossen, W. Kern, editors, Academic Press, 1978, Part IV, Chapter IV-1 Plasma Deposition of Inorganic Compounds, Chapter IV-2 Glow Discharge Polymerization, which is incorporated herein by reference. Briefly, a glow discharge plasma is generated on an electrode that may be smooth or have pointed projections. Traditionally, a gas inlet introduces high vapor pressure monomeric gases into the plasma region wherein radicals are formed so that upon subsequent collisions with the substrate, some of the radicals in the monomers chemically bond or cross link (cure) on the substrate. The high vapor pressure monomeric gases include gases of $CH_4$, $SiH_4$, $C_2H_6$, $C_2H_2$, or gases generated from high vapor pressure liquid, for example styrene (10 torr at 87.4° F. (30.8° C.)), hexane (100 torr at 60.4° F. (15.8° C.)), tetramethyldisiloxane (10 torr at 82.9° F. (28.3° C.), 1,3,-dichlorotetramethyldisiloxane) (75 torr at 44.6° F. (7.0° C.)), and combinations thereof that may be evaporated with mild controlled heating. Because these high vapor pressure monomeric gases do not readily cryocondense at ambient or elevated temperatures, deposition rates are low (a few tenths of micrometer/min maximum) relying on radicals chemically bonding to the surface of interest instead of cryocondensation. Remission due to etching of the surface of interest by the plasma competes with reactive deposition. Lower vapor pressure species have not been used in PECVD because heating the higher molecular weight monomers to a temperature sufficient to vaporize them generally causes a reaction prior to vaporization, or metering of the gas becomes difficult to control, either of which is inoperative.

The basic process of flash evaporation is described in U.S. Pat. No. 4,954,371, which is incorporated herein by reference. This basic process may also be referred to as polymer multi-layer (PML) flash evaporation. Briefly, a radiation polymerizable and/or cross linkable material is supplied at a temperature below a decomposition temperature and polymerization temperature of the material. The material is atomized to droplets having a droplet size ranging from about 1 to about 50 microns. An ultrasonic atomizer is generally used. The droplets are then flash vaporized, under vacuum, by contact with a heated surface above the boiling point of the material, but below the temperature which would cause pyrolysis. The vapor is cryocondensed on a substrate, then radiation polymerized or cross linked as a very thin polymer layer.

Figure 1A:
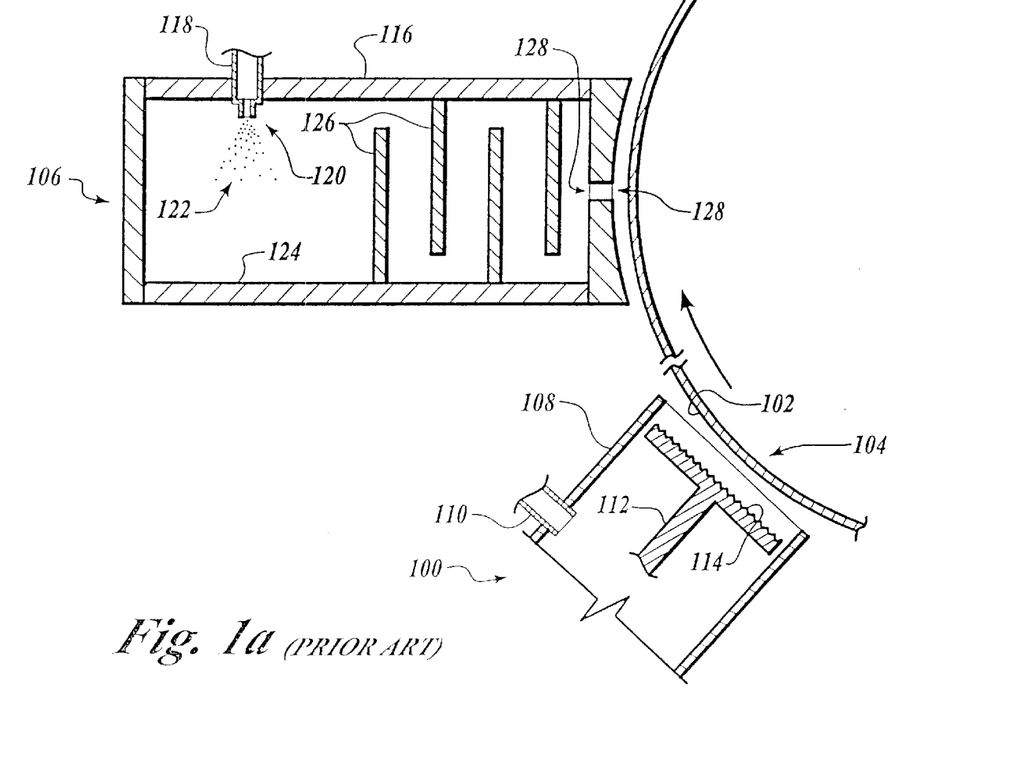
FIG. 1*a* is a cross section of a prior art combination of a glow discharge plasma generator with inorganic compounds with flash evaporation.
Figure 1B:
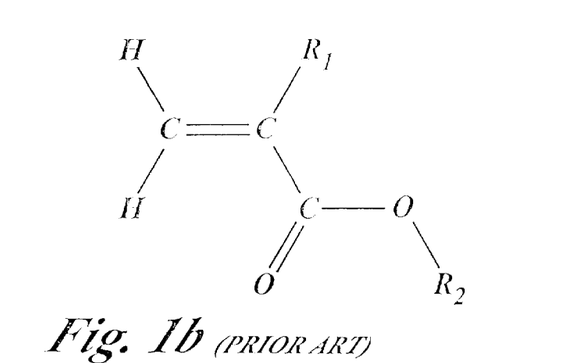
FIG. 1*b* is a chemical diagram of (meth)acrylate.

According to the state of the art of making plasma polymerized films, PECVD and flash evaporation or glow discharge plasma deposition and flash evaporation have not been used in combination. However, plasma treatment of a substrate, using glow discharge plasma generator with inorganic compounds has been used in combination with flash evaporation under a low pressure (vacuum) atmosphere as reported in J. D. Affinito, M. E. Gross, C. A. Coronado, and P. M. Martin, "Vacuum Deposition Of Polymer Electrolytes On Flexible Substrates," Proceedings of the Ninth International Conference on Vacuum Web Coating, November 1995, ed. R. Bakish, Bakish Press 1995, pp. 20–36, and as shown in FIG. 1a. In that system, the plasma generator 100 is used to etch the surface 102 of a moving substrate 104 in preparation to receive the monomeric gaseous output from the flash evaporation 106 that cryocondenses on the etched surface 102 and is then passed by a first curing station (not shown), for example electron beam or ultra-violet radiation, to initiate cross linking and curing. The plasma generator 100 has a housing 108 with a gas inlet 110. The gas may be oxygen, nitrogen, water or an inert gas, for example argon, or combinations thereof. Internally, an electrode 112 that is smooth or has one or more pointed projections 114 produces a glow discharge and makes a plasma with the gas which etches the surface 102. The flash evaporator 106 has a housing 116, with a polymer precursor inlet 118 and an atomizing nozzle 120, for example an ultrasonic atomizer. Flow through the nozzle 120 is atomized into particles or droplets 122 which strike the heated surface 124 whereupon the particles or droplets 122 are flash evaporated into a gas that flows past a series of baffles 126 (optional) to an outlet 128 and cryocondenses on the surface 102. Although other gas flow distribution arrangements have been used, it has been found that the baffles 126 provide adequate gas flow distribution or uniformity while permitting ease of scaling up to large surfaces 102. A curing station (not shown) is located downstream of the flash evaporator 106. The monomer may be a (meth)acrylate (FIG. 1*b*).

Traditional methods for making non-linear optical polymers employ spin coating. In one type of spin coating, non-linear optical molecules are attached to the polymer backbone. Poling is then by heating to a temperature above a glass transition temperature to align the non-linear optical groups. However, the polymer backbone is not aligned and over time the poled groups relax to their non-poled condition which is unsuitable for long term devices. In another type of spin coating, the non-linear optical groups are simply mixed with the polymer precursor without attachment. Again, the poled groups relax over time. Another disadvantage is in making a non-linear optical polymer part of a multi-layer construction wherein the non-linear optical polymer must be physically moved or transferred to an area where the additional layer is applied, for example vacuum deposition.

Therefore, there is a need for an improved method for making non-linear optical polymers.

SUMMARY OF THE INVENTION

The present invention provides a method of making a non-linear optical polymer layer. The method includes providing a liquid polymer precursor mixture containing a plurality of non-linear optical molecules, flash evaporating the liquid polymer precursor mixture forming an evaporate, and continuously cryocondensing the evaporate on a cool substrate forming a cryocondensed polymer precursor layer and cross linking the cryocondensed polymer precursor layer thereby forming the non-linear optical polymer layer.

The flash evaporating may be performed by supplying a continuous liquid flow of the molecularly doped polymer precursor mixture into a vacuum environment at a temperature below both the decomposition temperature and the polymerization temperature of the molecularly doped polymer precursor mixture, continuously atomizing the molecularly doped polymer precursor mixture into a continuous flow of droplets, and continuously vaporizing the droplets by continuously contacting the droplets on a heated surface having a temperature at or above a boiling point of the liquid polymer precursor and of the molecular dopant, but below a pyrolysis temperature, forming the composite vapor. The droplets typically range in size from about 1 micrometer to about 50 micrometers, but they could be smaller or larger.

Alternatively, the flash evaporating may be performed by supplying a continuous liquid flow of the polymer precursor mixture into a vacuum environment at a temperature below both the decomposition temperature and the polymerization temperature of the polymer precursor mixture, and continuously directly vaporizing the liquid flow of the polymer precursor mixture by continuously contacting the liquid polymer precursor mixture on a heated surface having a temperature at or above the boiling point of the liquid polymer precursor, but below the pyrolysis temperature, forming the evaporate. This may be done using the vaporizer disclosed in U.S. Pat. Nos. 5,402,314, 5,536,323, and 5,711,816, which are incorporated herein by reference.

After condensation, the cross linking may be by any standard curing technique, including, but not limited to, radiation curing, including ultraviolet, electron beam, or x-ray, glow discharge ionization, and spontaneous thermal induced curing. In radiation curing (FIG. 1), the liquid polymer precursor mixture may include a photoinitiator. In glow discharge ionization curing, a combined flash evaporator, glow discharge plasma generator is used without either an electron beam gun or ultraviolet light.

Base polymer precursors may be monomers, oligomers, and resins, and combinations thereof. Examples of monomers include, but are not limited to, (meth)acrylate molecules, for example, hexanedioldiacrylate, and tetraethyleneglycoldiacrylate, styrene polymer precursors, and methyl styrene polymer precursors, and combinations thereof. Oligomers, include, but are not limited to, polyethylene glycol diacrylate 200, polyethylene glycol diacrylate 400, and polyethylene glycol diacrylate 600, tripropyleneglycol diacrylate, tetraethylene glycol diacrylate, tripropylene glycol monoacrylate, and caprolactone acrylate, and combinations thereof. Resins include, but are not limited to, polystyrene resins, epoxy polyamine resins, phenolic resins, and (meth)acrylic resins, and combinations thereof. Base polymers also include allyls, alkynes, and phenyl acetylene.

Non-linear optical molecules include, but are not limited to, dimethylamino nitrostilbene, methyl nitroaniline, urea and combinations thereof.

Accordingly, the present invention provides an improved method of making a non-linear optical polymer.

DETAILED DESCRIPTION OF THE INVENTION

According to the present invention, a non-linear optical polymer layer may be made by providing a liquid polymer precursor mixture containing a plurality of non-linear optical molecules, flash evaporating the liquid polymer precursor mixture forming an evaporate, and continuously cryocondensing the evaporate on a cool substrate forming a cryocondensed polymer precursor layer and cross linking the cryocondensed polymer precursor layer thereby forming the non-linear optical polymer layer.

Flash evaporation may include supplying a continuous liquid flow of the polymer precursor particle mixture into a vacuum environment at a temperature below both the decomposition temperature and the polymerization temperature of the polymer precursor particle mixture, continuously atomizing the polymer precursor particle mixture into a continuous flow of droplets, and continuously vaporizing the droplets by continuously contacting the droplets on a heated surface having a temperature at or above a boiling point of the liquid polymer precursor mixture, but below a pyrolysis temperature, forming the composite evaporate.

Alternatively, the flash evaporating may be performed by supplying a continuous liquid flow of the liquid polymer precursor mixture into a vacuum environment at a temperature below both the decomposition temperature and the polymerization temperature of the liquid polymer precursor mixture, and continuously directly vaporizing the liquid flow of the liquid polymer precursor mixture by continuously contacting the liquid polymer precursor mixture on a heated surface having a temperature at or above a boiling point of the liquid polymer precursor mixture, but below a pyrolysis temperature, forming the composite evaporate. This may be done using the vaporizer disclosed in U.S. Pat. Nos. 5,402,314, 5,536,323, and 5,711,816, which are incorporated herein by reference.

The step of crosslinking may produce a polymer layer by any standard curing technique, including, but not limited to, radiation, including ultraviolet, electron beam, and x-ray, glow discharge ionization, and spontaneous thermal induced curing. In radiation curing (FIG. 1), the liquid polymer precursor mixture may include a photoinitiator. In glow discharge ionization curing, a combined flash evaporator, glow discharge plasma generator is used without either an electron beam gun or ultraviolet light.

By using flash evaporation, the liquid polymer precursor mixture containing non-linear optical molecules is vaporized so quickly that reactions that generally occur from heating a liquid material to an evaporation temperature simply do not occur. Further, control of the rate of evaporate delivery is strictly controlled by the rate of material delivery to the inlet 118 of the flash evaporator 106.

The liquid polymer precursor mixture may be simply a plurality of non-linear optical molecules, as for example, dimethylamino nitrostilbene, methyl nitroanaline, urea and combinations thereof, but more likely is a plurality of non-linear optical molecules mixed with a base polymer precursor. The plurality of non-linear optical molecules may be liquid, solid, or a solution, as for example, solid particles.

The base polymer precursor may be any polymer precursor useful in flash evaporation for making polymer films. Base polymer precursors may be monomers, oligomers, and resins, and combinations thereof. Examples of monomers include, but are not limited to, (meth)acrylate molecules, for example, hexanedioldiacrylate, and tetraethyleneglycoldiacrylate, styrene, and methyl styrene, and combinations thereof. Oligomers, include, but are not limited to, polyethylene glycol diacrylate 200, polyethylene glycol diacrylate 400, and polyethylene glycol diacrylate 600, tripropyleneglycol diacrylate, tetraethylene glycol diacrylate, tripropylene glycol monoacrylate, and caprolactone acrylate, and combinations thereof. Resins include, but are not limited to, polystyrene resins, epoxy polyamine resins, phenolic resins, and (meth)acrylic resins, and combinations thereof. Base polymers also include, but are not limited to, phenyl acetylene, allyl polymer precursors, and alkyne polymer precursors, and combinations thereof. The (meth)acrylate polymer precursors are particularly useful in flash evaporation.

The base polymer precursor may have a low vapor pressure at ambient temperatures so that it will readily cryocondense. The vapor pressure of the base polymer precursor may be less than about 10 torr at 83° F. (28.3° C.), less than about 1 torr at 83° F. (28.3° C.), or less than about 10 millitorr at 83° F. (28.3° C.), if desired.

Figure 5A:
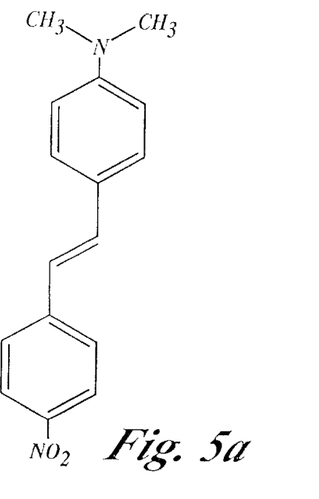
FIG. 5*a* is a chemical diagram of DANS.
Figure 5B:
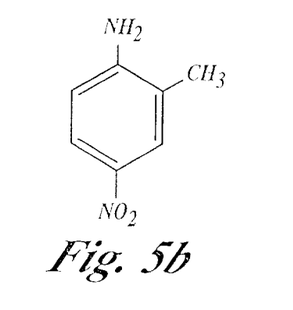
FIG. 5*b* is a chemical diagram of MNA.
Figure 5C:
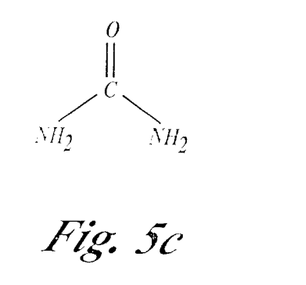
FIG. 5*c* is a chemical diagram of urea.

Non-linear optical molecules include, but are not limited to, dimethylamino nitrostilbene (DANS, FIG. 5a), methyl nitroanaline (MNA FIG. 5b), and urea (FIG. 5c) and combinations thereof.

During flash evaporation, prior to condensation, the non-linear optical molecules have the opportunity to attach to a backbone of the base polymer precursor. Upon condensation and crosslinking, the resulting polymer layer is a non-linear optical polymer layer. If, in addition, the substrate has an applied electrical field during deposition (condensation and crosslinking), poling aligns the backbone as well as the attached non-linear optical molecules in a manner that is permanent and avoids relaxation.

When the non-linear optical molecules are mixed with a base polymer precursor, the non-linear optical molecules may be in the form of particles that may be soluble, partially soluble, or insoluble with the base polymer precursor. The particles typically have a volume less than about 5000 cubic micrometers (diameter about 21 micrometers) or equal thereto, and generally less than or equal to about 4 cubic micrometers (diameter about 2 micrometers). In one embodiment, the non-linear optical molecules are sufficiently small with respect to particle density and base polymer precursor density and viscosity that the settling rate of the non-linear optical molecules within the base polymer precursor is several times greater than the amount of time to transport a portion of the liquid polymer precursor mixture from a reservoir to the atomization nozzle. The liquid polymer precursor mixture may need to be agitated in the reservoir to maintain suspension of the non-linear optical molecules and avoid settling. As used herein, agitation includes, but is not limited to, stirring, physical shaking, ultrasonic vibration, and convection (thermal gradient).

The mixture of base polymer precursor and non-linear optical molecules may be considered a solution, slurry, suspension, or emulsion, and the non-linear optical molecules may be solid or liquid. The mixture may be obtained by several methods. One method is to mix particles of a specified size into the base polymer precursor. The particles of a solid of a specified size may be obtained by direct purchase or by making them by one of any standard techniques, including, but not limited to, milling from large particles, precipitation from solution, melting/spraying under controlled atmospheres, rapid thermal decomposition of precursors from solution as described in U.S. Pat. No. 5,652,192 (the '192 patent), which is incorporated herein by reference. The '192 patent teaches making a solution of a soluble precursor in a solvent and flowing the solution through a reaction vessel, pressurizing and heating the flowing solution and forming substantially insoluble particles, then quenching the heated flowing solution and arresting growth of the particles. Alternatively, larger sizes of solid material may be mixed into base polymer precursor then agitated, for example ultrasonically, to break the solid material into particles of sufficient size.

Liquid particles may be obtained by mixing an immiscible liquid with the base polymer precursor and agitating by ultrasonic or mechanical mixing to produce liquid particles within the base polymer precursor. Immiscible liquids include, but are not limited to, alkynes, and/or allyls.

Other particle(s) may be included with the liquid polymer precursor mixture that are soluble, insoluble, or partially soluble particles having a boiling point below a temperature of the heated surface in the flash evaporation process. Soluble particles include, but are not limited to, substituted metal tris (N-R 8-quinolinolato) chelates, wherein N is between 2 and 7 and is the substituent position of the ligand, and wherein R is H, alkyl, alkoxy, and fluorinated hydrocarbons; and substituted tertiaryaromatic amines; such as for example:

R=H, alkyl, alkoxy and fluorinated hydrocarbons n=3, M=Al$^{+3}$, Ga$^{+3}$, In$^{+3}$
n=1, M=Li$^{+1}$
R=alkyl, alkoxy, and fluorinated hydrocarbons M=Al$^{+3}$, Ga$^{+3}$, In$^{+3}$
R=alkyl, alkoxy, and fluorinated hydrocarbons
L=monodentate ligand, such as carboxlyate, phenolate and derivatives of.

Insoluble particles include, but are not limited to, tertiary aromatic amines, such as triphenyl diamine derivatives, quinacridone derivatives, and metal (8-quinolinolato) chelates, such as aluminum quinolinolato (Alq), gallium quinolinolato (Gaq), and lithium quinolinolato (Liq), and combinations thereof. Partially soluble means that some of the particles do not dissolve in the polymer precursor, including the situation in which a soluble particle is present in a concentration exceeding the solubility limit in the polymer precursor so that some of the dissolvable material remains undissolved.

If an atomizer is used, upon spraying the droplets may be particles (non-linear optical molecules, other particles, or both) alone, particles surrounded by base polymer precursor and base polymer precursor alone. Since both the base polymer precursor and the particles are evaporated, it is of no consequence either way. The droplets may be sufficiently small that they are completely vaporized. Accordingly, the droplet size may range from about 1 micrometer to about 50 micrometers, although larger or smaller droplets may be used if desired.

During flash evaporation, the liquid polymer precursor mixture is evaporated. In the cases wherein the liquid polymer precursor mixture is a combination of a base polymer precursor and non-linear optical molecules, the non-linear optical molecules may combine with the base polymer precursor in the vapor phase prior to cryocondensation.

Figure 2:
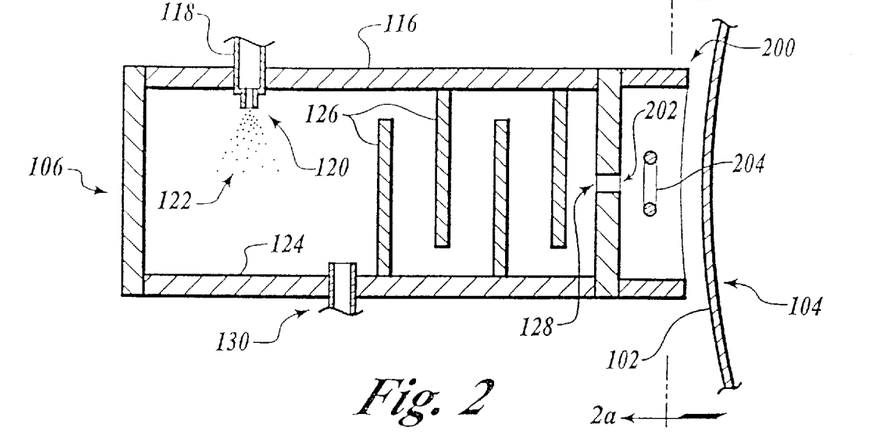
FIG. 2 is a cross section of the apparatus which can be used in the present invention of combined flash evaporation and glow discharge plasma deposition.

A non-linear optical polymer layer may be made with the apparatus shown in FIG. 2. The apparatus and method of the present invention may be performed within a low pressure (vacuum) environment or chamber. Pressures typically range from about $10^{-1}$ torr to $10^{-6}$ torr, but may be higher or lower if desired. The flash evaporator 106 has a housing 116, with a polymer precursor inlet 118 and an atomizing nozzle 120. Flow through the nozzle 120 is atomized into particles or droplets 122 which strike the heated surface 124 whereupon the particles or droplets 122 are flash evaporated into a gas or evaporate that flows past a series of baffles 126 to an evaporate outlet 128 and cryocondenses on the surface 102. Cryocondensation on the baffles 126 and other internal surfaces is prevented by heating the baffles 126 and other surfaces to a temperature in excess of a cryocondensation temperature or dew point of the evaporate. Although other gas flow distribution arrangements have been used, it has been found that the baffles 126 provide adequate gas flow distribution or uniformity while permitting ease of scaling up to large surfaces 102.

For plasma curing, a glow discharge electrode 204 may be located near the evaporate outlet 128 for creating a glow discharge plasma from the evaporate. In the embodiment shown in FIG. 2, the glow discharge electrode 204 is placed in a glow discharge housing 200 having an evaporate inlet 202 proximate the evaporate outlet 128. In this embodiment, the glow discharge housing 200 and the glow discharge electrode 204 are maintained at a temperature above a dew point of the evaporate. The glow discharge plasma exits the glow discharge housing 200 and cryocondenses on the surface 102 of the substrate 104. The substrate 104 is generally kept at a temperature below a dew point of the evaporate, typically at ambient temperature or cooled below ambient temperature to enhance the cryocondensation rate.

Figure 2A:
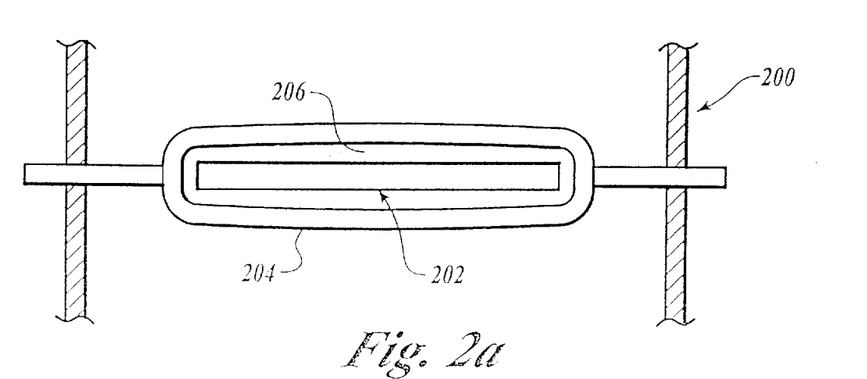
FIG. 2*a* is a cross section end view of the apparatus of FIG. 2.

The substrate 104 may be moving, and may be electrically grounded, electrically floating, or electrically biased with an impressed voltage to pole the cryocondensate. When a glow discharge plasma is used, an impressed voltage may also draw charged species from the glow discharge plasma. If the substrate 104 is electrically biased, it may even replace the electrode 204 and be, itself, the electrode which creates the glow discharge plasma from the polymer precursor gas. Substantially not electrically biased means that there is no impressed voltage although a charge may build up due to static electricity or due to interaction with the plasma. One shape of the glow discharge electrode 204 is shown in FIG. 2a. In this embodiment, the glow discharge electrode 204 is separate from the substrate 104 and shaped so that evaporate flow from the evaporate inlet 202 substantially flows through an electrode opening 206. The shape of the electrode 204 shown in FIG. 2a does not shadow the plasma from the evaporate issuing from the outlet 202 and its symmetry, relative to the polymer precursor exit slit 202 and substrate 104, provides uniformity of the evaporate vapor flow to the plasma across the width of the substrate while uniformity transverse to the width follows from the substrate motion. However, any electrode shape can be used to create the glow discharge.

The spacing of the electrode 204 from the substrate 104 is a gap or distance that permits the plasma to impinge upon the substrate. This distance that the plasma extends from the electrode will depend on the evaporate species, electrode 204/substrate 104 geometry, electrical voltage and frequency, and pressure in the standard way as described in detail in ELECTRICAL DISCHARGES IN GASSES, F. M. Penning, Gordon and Breach Science Publishers, 1965, and summarized in THIN FILM PROCESSES, J. L. Vossen, W. Kern, editors, Academic Press, 1978, Part II, Chapter I-1 Glow Discharge Sputter Deposition, which are incorporated herein by reference.

Figure 3:
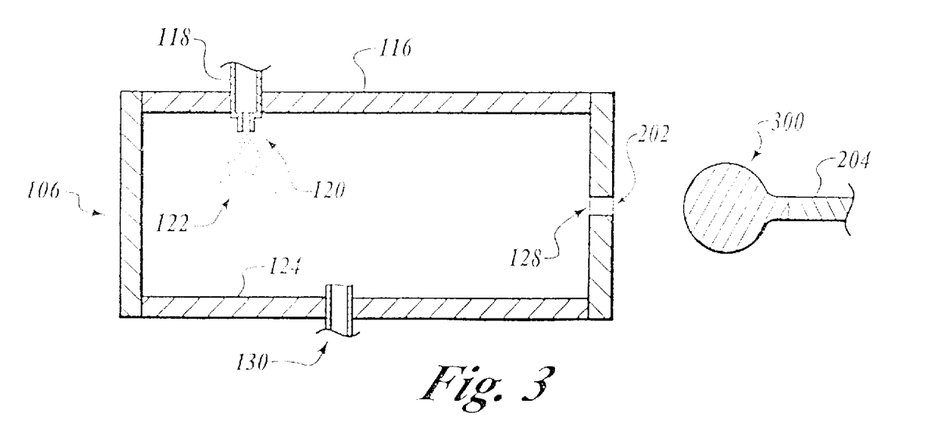
FIG. 3 is a cross section of an apparatus wherein the substrate is the electrode.
Figure 4:
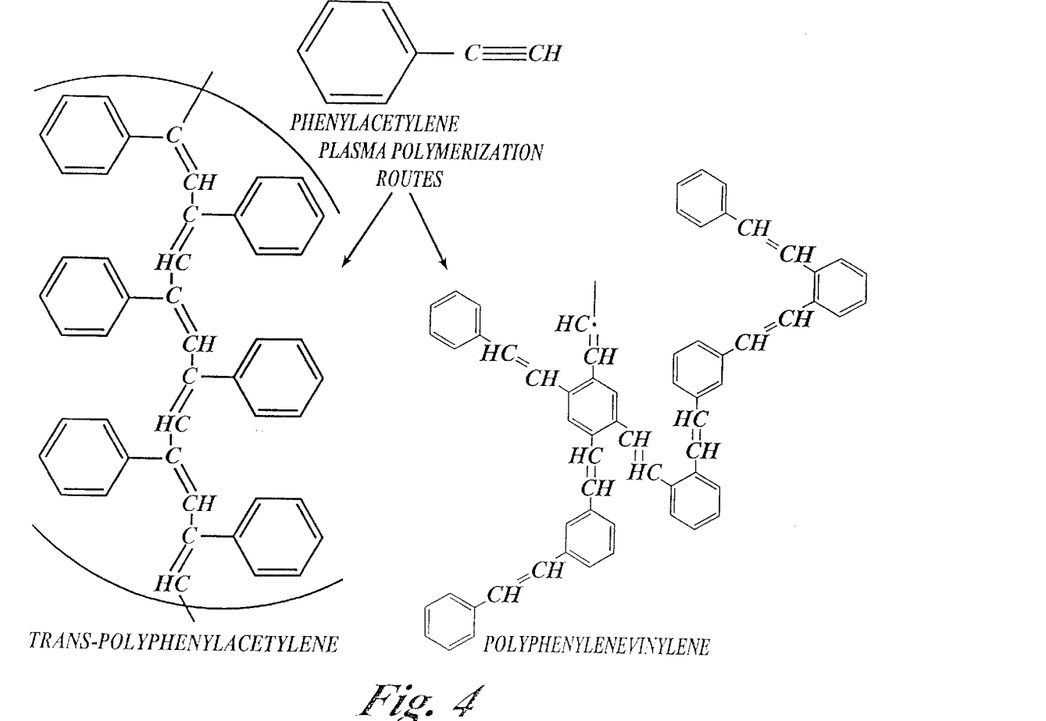
FIG. 4 is a chemical diagram including phenylacetylene.

An apparatus suitable for batch operation is shown in FIG. 3. In this embodiment, the glow discharge electrode 204 is sufficiently proximate a part 300 (substrate) that the part 300 is an extension of or part of the electrode 204. Moreover, the part is below a dew point to allow cryocondensation of the glow discharge plasma on the part 300 and thereby coat the part 300 with the polymer precursor condensate and self cure into a polymer layer. Sufficiently proximate may be connected to, resting upon, in direct contact with, or separated by a gap or distance that permits the plasma to impinge upon the substrate. This distance that the plasma extends from the electrode will depend on the evaporate species, electrode 204/substrate 104 geometry, electrical voltage and frequency, and pressure in the standard way as described in ELECTRICAL DISCHARGES IN GASSES. The part 300 may be stationary or moving during cryocondensation. Moving includes rotation and translation and may be employed for controlling the thickness and uniformity of the polymer precursor layer cryocondensed thereon. Because the cryocondensation occurs rapidly, within milli-seconds to seconds, the part may be removed after coating and before it exceeds a coating temperature limit.

In addition to the evaporate from the material, additional gases may be added within the flash evaporator 106 through a gas inlet 130 upstream of the evaporate outlet 128, which can be between the heated surface 124 and the first baffle 126 nearest the heated surface 124. Additional gases may be organic or inorganic for purposes including, but not limited to, ballast, reaction and combinations thereof. Ballast refers to providing sufficient molecules to keep the plasma lit in circumstances of low evaporate flow rate. Reaction refers to chemical reaction to form a compound different from the evaporate. Additional gases include, but are not limited to, group VIII of the periodic table, hydrogen, oxygen, nitrogen, chlorine, bromine, and polyatomic gases, including for example, carbon dioxide, carbon monoxide, water vapor, and combinations thereof. The use of the present method preserves the conjugation (if any) during curing. In addition, multiple layers of materials may be combined. For example, as recited in U.S. Pat. Nos. 5,547,508, 5,395,644, and 5,260,095, which are incorporated herein by reference, multiple polymer layers, alternating layers of polymer and metal, and other layers may be made with the present invention in the vacuum environment.

When the present invention is used with plasma curing, it is insensitive to the direction of motion of the substrate because the deposited polymer precursor layer is self curing. Furthermore, the present invention may be used to make conformal coatings. Because of rapid curing, the polymer precursor has less time to flow and is therefore more uniformly thick.

While certain representative embodiments and details have been shown for purposes of illustrating the invention, it will be apparent to those skilled in the art that various changes in the compositions and methods disclosed herein may be made without departing from the scope of the invention, which is defined in the appended claims.

We claim:

1. A method of making a non-linear optical polymer layer, comprising:
    (a) providing a liquid polymer precursor mixture containing a plurality of non-linear optical molecules;
    (b) flash evaporating the liquid polymer precursor mixture forming an evaporate; and
    (c) continuously cryocondensing the evaporate on a cool substrate forming a cryocondensed polymer precursor layer and cross linking the cryocondensed polymer precursor layer thereby forming the non-linear optical polymer layer.

2. The method as recited in claim 1, wherein flash evaporating comprises:
    (a) supplying a continuous liquid flow of the liquid polymer precursor mixture into a vacuum environment at a temperature below both the decomposition temperature and the polymerization temperature of the liquid polymer precursor mixture;
    (b) continuously atomizing the liquid polymer precursor mixture into a continuous flow of droplets;
    (c) continuously vaporizing the droplets by continuously contacting the droplets on a heated surface having a temperature at or above a boiling point of the liquid polymer precursor mixture, but below a pyrolysis temperature of the liquid polymer precursor mixture, forming the evaporate.

3. The method as recited in claim 2, wherein the droplets are particles alone, particles surrounded by base polymer precursor, or base polymer precursor alone.

4. A method as recited in claim 2, wherein the droplets range in size from about 1 micrometer to about 50 micrometers.

5. The method as recited in claim 1, wherein the cross linking is selected from the group consisting of ultraviolet cross linking, electron beam cross linking, x-ray cross-linking, glow discharge ionization cross linking, and thermally induced cross linking.

6. The method as recited in claim 1, wherein flash evaporating comprises:
    supplying a continuous liquid flow of the liquid polymer precursor mixture into a vacuum environment at a temperature below both the decomposition temperature and the polymerization temperature of the liquid polymer precursor mixture; and
    continuously directly vaporizing the liquid flow of the liquid polymer precursor mixture by continuously contacting the liquid polymer precursor mixture on a heated surface having a temperature at or above a boiling point of the liquid polymer precursor mixture, but below a pyrolysis temperature of the liquid polymer precursor mixture, forming the evaporate.

7. The method as recited in claim 1, further comprising passing the evaporate past a glow discharge electrode prior to cryocondensing, wherein the cross linking is by glow discharge ionization.

8. The method as recited in claim 1, wherein the liquid polymer precursor mixture is a mixture of a base polymer precursor and the plurality of non-linear optical molecules.

9. The method as recited in claim 8, wherein the base polymer precursor is selected from the group consisting of (meth)acrylate polymer precursors, styrene polymer precursors, methyl styrene polymer precursors, epoxy polyamine polymer precursors, phenolic polymer precursors, allyl polymer precursors, alkyne polymer precursors, and phenyl acetylene polymer precursors, and combinations thereof.

10. The method as recited in claim 8, wherein the base polymer precursor is a (meth)acrylate polymer precursor selected from the group consisting of polyethylene glycol diacrylate 200, polyethylene glycol diacrylate 400, polyethylene glycol diacrylate 600, tripropyleneglycol diacrylate, tetraethylene glycol diacrylate, tripropylene glycol monoacrylate, and caprolactone acrylate, and combinations thereof.

11. The method as recited in claim 1, wherein the non-linear optical molecules are selected from the group consisting of dimethylamino nitrostilbene, methyl nitroanaline, and urea, and combinations thereof.

12. The method as recited in claim 1, wherein the substrate is electrically biased thereby poling the cryocondensed polymer precursor layer prior to cross linking.

13. The method as recited in claim 1, wherein the substrate is electrically grounded.

14. The method as recited in claim 1, wherein the substrate is electrically floating.

15. The method as recited in claim 1, wherein the non-linear optical molecules are sufficiently small that the settling rate of the non-linear optical molecules within the liquid polymer precursor mixture is several times greater than the amount of time to transport a portion of the liquid polymer precursor mixture from a reservoir to an atomization nozzle.

16. The method as recited in claim 1, further comprising agitating the liquid polymer precursor mixture.

17. The method as recited in claim 1, wherein the non-linear optical molecules are in the form of particles having a volume less than about 5000 cubic micrometers.

18. The method as recited in claim 1, wherein the non-linear optical molecules are in the form of particles having a volume less than about 4 cubic micrometers.

* * * * *